Feb. 28, 1956     C. E. WIEGAND ET AL     2,736,801

DISTRIBUTED PULSE HEIGHT DISCRIMINATOR

Filed May 16, 1951

INVENTORS.
CLYDE E. WIEGAND
OWEN CHAMBERLAIN

BY Roland A. Anderson

ATTORNEY.

United States Patent Office 2,736,801
Patented Feb. 28, 1956

2,736,801

DISTRIBUTED PULSE HEIGHT DISCRIMINATOR

Clyde E. Wiegand, Oakland, and Owen Chamberlain, Berkeley, Calif., assignors to the United States of America as represented by the United States Atomic Energy Commission Application May 16, 1951, Serial No. 226,638

3 Claims. (Cl. 250—27)

This invention relates to a pulse height discriminator and more particularly to a wide band pulse height discriminator utilizing distributed circuit components.

Scintillation counters have become very useful for the detection of charged particles; however, it has been found that conventional circuits are inadequate to properly handle pulses of light given off by the fluorescing material or crystal. Since light pulses given off by scintillation crystals may have a duration of approximately $10^{-8}$ seconds, it is necessary to utilize special electronic circuits to detect, shape or amplify the pulses or to discriminate between pulses of different amplitudes. It is also desirable to handle greater than $10^7$ counts per second; therefore, scintillation counter circuits should have an effective resolving time of approximately $10^{-8}$ seconds. A discriminator should be able to discriminate reliably between pulses that differ in amplitude by a fraction of a volt; it should present a high impedance to the signal source and should respond to each of many pulses that occur in rapid succession; it should not overload on a pulse of amplitude much greater than the critical amplitude; that is, it should not distort large signals that it receives, nor should its operation depend upon the size of the previous input pulses and it should have an easily adjustable discrimination voltage. The pulse height discriminators now available have some of the above-mentioned desirable characteristics, but none are known that will accept pulses of such short duration at a rate of over $10^7$ pulses per second.

To accomplish the aforementioned desirable features the present invention utilizes a plurality of series connected inductance coils having the midpoints of each inductance coil connected to the cathode of a diode tube, the anodes being connected together. These inductances in combination with the interelectrode capacitance of the diode tubes form an artificial transmission line which may also be referred to as a series of $m$-derived low-pass filters. Means for applying an adjustable voltage between the anodes and the cathodes of said diodes is provided.

It is therefore an object of this invention to provide a new and improved pulse height discriminator circuit.

A further object of this invention is to provide a pulse height discriminator which will function with input pulses having a duration of approximately $10^{-8}$ seconds.

Another object of the present invention is to provide a pulse height discriminator that has a resolving time between pulses of the order of $10^{-8}$ seconds.

A still further object of the invention is to provide a pulse height discriminator that will accept more than $10^7$ pulses per second.

Another object of this invention is to provide a pulse height discriminator that presents a high impedance to the signal source.

Still another object of this invention is to provide a pulse height discriminator that does not overload with large pulses.

A still further object of the invention is to provide a pulse height discriminator that has an easily adjustable discrimination voltage.

Other objects and advantages of the invention will be apparent in the following description and claims considered together with the accompanying drawing which is a schematic wiring diagram of the invention.

Referring to the drawing in detail there is shown a plurality of center-tapped inductances 11 connected in series. Connected to one end of the series of inductances 11 is an input coupling capacitor 13 and connected to the other end of the series of inductances is an output coupling capacitor 14. Also connected between the output end of the series of inductances and ground is an impedance matching resistor 16 to prevent voltage reflections. Connected to the midpoints of each inductance 11 is the cathode of a diode tube 17. The anodes of the diode tubes 17 are connected together and through a by-pass capacitor 18 to ground.

Considering the interelectrode capacitance of the diode tubes 17 it is readily apparent that the aforementioned circuit components comprise the essential elements of an artificial transmission line or a series of low-pass filters. Since the interelectrode capacitance of the diode 17 is of the order of a few micro-microfarads the low-pass filter circuit will accept a wide range of frequencies, including frequencies higher than $10^7$ cycles or pulses per second.

Also connected to the anodes of the diode tubes 17 is one end of a variable resistor 19 having the other end thereof connected to the positive terminal of a unidirectional voltage supply 21. A capacitor 22 is connected between the positive terminal of the unidirectional voltage supply 21 and ground and has the function of bypassing high frequency voltage to ground. The unidirectional voltage supply 21 has its negative terminal connected to ground which completes the circuit to apply a voltage between the anode and the cathode of each diode tube 17.

Now consider the operation of the above-described circuit. With the unidirectional power supply 21 energized the variable resistor 19 is adjusted until the voltage drop across the diode tubes 17 is the desired discrimination voltage. Under this condition the diode tubes 17 are conducting, thereby creating a low impedance path to ground through the capacitor 18. If a positive signal having an amplitude greater than the voltage drop across the diode tubes 17 is applied to the input terminals of the above-described artificial transmission line, it will travel along the line and raise each of the cathodes to a value more positive than their respective anodes, thereby rendering the diodes non-conducting and creating a very high impedance to ground. Thus, the signal is able to traverse the entire length of the artificial transmission line and appear as an output pulse at the capacitor 14. However, if the pulse fed into the transmission line is negative or has a positive value less than the voltage drop across the diode tubes 17, it will be shunted to ground by the low impedance path formed by each of the conducting tubes. Therefore, it can be seen that negative pulses and small positive pulses are attenuated and positive pulses with a value greater than the voltage drop across the diodes 17 appear at the output end of the transmission line. The discrimination voltage is easily adjusted by varying the resistor 19. If the position of the anode and the cathode of the diodes 17 were reversed and the polarity of the voltage supply 21 was reversed accordingly, positive pulses and negative pulses having a value less than the voltage drop across the diode would be attenuated while negative pulses having a value greater than the voltage drop across the diodes would appear at the output end of the transmission line.

The foregoing circuit has been found to have a discrimination ratio greater than three to one for pulses having a duration as short as $10^{-8}$ seconds and occurring at a rate greater than $10^7$ pulses per second, the discrimination ratio being defined as the ratio between the difference between two output pulses to the difference between the corresponding input pulses.

While the salient features of the present invention have been described with respect to one embodiment it will, of course, be apparent that numerous modifications may be made within the spirit and scope of the invention and it is therefore not desired to limit the invention to the exact details shown except insofar as they may be defined by the following claims.

What is claimed is:

1. In a pulse height discriminator, the combination comprising a plurality of series-connected inductances coupled at one end to an input terminal and at the other end to an output terminal, a plurality of diode tubes having the cathodes thereof respectively connected to a tap of said inductances and the anodes thereof directly connected together, the value of said inductances being selected to provide with the interelectrode capacitance of said tubes a section of artificial transmission line having a time constant of substantially $10^{-8}$ seconds, a resistor connected at the output end of said series of inductances and having a value substantially equal to the characteristic impedance of the artificial transmission line, a by-pass condenser connected from the anodes of said tubes to a ground connection, and a power supply having the negative terminal connected to ground and the positive terminal coupled to the anodes of said tube through a variable impedance element to render said tubes normally conductive whereby a positive pulse of voltage applied between said input terminal and a ground connection will be transmitted to said output terminal only when the value thereof exceeds the value of positive voltage applied to the anodes of said tubes.

2. The combination of claim 1 further characterized by said plurality of series-connected inductances each having a center tap and the cathodes of said diodes respectively connected to said center taps.

3. The combination of claim 1 further characterized by said by-pass condenser having a value of capacitance providing a low impedance path for high frequency voltage variations at the anodes of said diodes.

References Cited in the file of this patent

UNITED STATES PATENTS

| | | |
|---|---|---|
| 1,613,952 | Johnson | Jan. 11, 1927 |
| 1,632,814 | Zinn | June 21, 1927 |
| 2,104,336 | Tuttle | Jan. 4, 1938 |
| 2,303,968 | White | Dec. 1, 1942 |
| 2,414,541 | Madsen | Jan. 21, 1947 |
| 2,439,651 | Dome | Apr. 13, 1948 |
| 2,536,032 | Clark, Jr. | Jan. 2, 1951 |
| 2,666,181 | Courtillot | Jan. 12, 1954 |